United States Patent
Stoll

(10) Patent No.: US 7,597,028 B2
(45) Date of Patent: Oct. 6, 2009

(54) INTEGRALLY MOLDED COMPOSITE STEERING WHEELS

(75) Inventor: Steven Stoll, Macomb, MI (US)

(73) Assignee: SABIC Innovative Plastics IP B.V., Bergen OP Zoom (NL)

( * ) Notice: Subject to any disclaimer, the term of this patent is extended or adjusted under 35 U.S.C. 154(b) by 324 days.

(21) Appl. No.: 11/213,544

(22) Filed: Aug. 26, 2005

(65) Prior Publication Data

US 2007/0068334 A1 Mar. 29, 2007

(51) Int. Cl.
*G05G 1/10* (2006.01)
*B62D 1/04* (2006.01)

(52) U.S. Cl. .......................................... 74/552; 280/779

(58) Field of Classification Search .................... 74/552, 74/557; 280/779; 148/440; 152/87; *B62D 1/08, B62D 1/10*
See application file for complete search history.

(56) References Cited

U.S. PATENT DOCUMENTS

| | | | | |
|---|---|---|---|---|
| 3,063,304 | A | * | 11/1962 | Manning ....................... 74/557 |
| 4,280,372 | A | | 7/1981 | Van Wicklin, Jr. |
| 4,640,150 | A | | 2/1987 | Kobayashi et al. |
| 4,962,947 | A | * | 10/1990 | Nagata et al. ................ 280/777 |
| 5,178,036 | A | | 1/1993 | Haldenwanger et al. |
| 5,445,048 | A | * | 8/1995 | Kaufer et al. .................. 74/552 |
| 5,765,864 | A | | 6/1998 | Winget |
| 5,782,116 | A | | 7/1998 | Ryan et al. |
| 5,901,615 | A | | 5/1999 | Itoh et al. |
| 6,164,691 | A | | 12/2000 | Hofer et al. |
| 6,386,579 | B1 | | 5/2002 | Reidy et al. |
| 6,454,883 | B1 | * | 9/2002 | Ruckert ........................ 148/440 |
| 6,740,856 | B1 | | 5/2004 | Haag |
| 2003/0101841 | A1 | | 6/2003 | Drefahl |
| 2003/0110882 | A1 | * | 6/2003 | Derrick ......................... 74/552 |
| 2003/0196737 | A1 | * | 10/2003 | Kimura ......................... 152/87 |
| 2004/0089096 | A1 | * | 5/2004 | Bostick et al. ................. 74/552 |
| 2005/0121896 | A1 | * | 6/2005 | Bonhard et al. ............. 280/779 |
| 2005/0235772 | A1 | * | 10/2005 | Becker et al. ................. 74/552 |
| 2007/0068335 | A1 | * | 3/2007 | Jaarda et al. .................. 74/552 |

FOREIGN PATENT DOCUMENTS

| | | |
|---|---|---|
| DE | 203 03 767 U 1 | 8/2003 |
| DE | 20303767 | 8/2003 |
| EP | 0 255 171 A1 | 7/1987 |
| EP | 0255171 | 7/1987 |

(Continued)

OTHER PUBLICATIONS http://dictionary.reference.com/browse/polyurethane (Jan. 21, 2009), 3 pages.*
http://www.knovel.com/web/portal/basic_search/display?_EXT_KNOVEL_DISPLAY_bookid=1-23&_E... (Jan. 21, 2009), 3 pages.*

(Continued)

*Primary Examiner*—Vinh T. Luong
(74) *Attorney, Agent, or Firm*—Armstrong Teasdale LLP

(57) ABSTRACT

A composite steering wheel for an automotive vehicle having a steering column is provided. In an exemplary embodiment, the composite steering wheel includes a rim, a center hub, and a plurality of spokes connecting the rim to the center hub. The rim, the center hub, and the plurality of spokes are formed from a deformable thermoplastic material. The composite steering wheel also includes an attachment member embedded in the center hub. The attachment member is sized to couple to the steering column.

10 Claims, 2 Drawing Sheets

FOREIGN PATENT DOCUMENTS

| | | |
|---|---|---|
| EP | 001033297 A2 * | 9/2000 |
| GB | 1014573 | 12/1965 |
| WO | WO 2004/007989 A2 | 1/2004 |
| WO | WO2004007989 | 1/2004 |

OTHER PUBLICATIONS

European Search Report and Opinion, European Patent Office, App. No. PCT/US2006/030608, Date of Completion of Search Dec. 4, 2006, 5 pgs.

* cited by examiner

US 7,597,028 B2

INTEGRALLY MOLDED COMPOSITE STEERING WHEELS

BACKGROUND OF THE INVENTION

This invention relates generally to steering wheels for automotive vehicles, and more particularly to integrally molded composite steering wheels including a deformable thermoplastic material.

Known steering wheels include a metal armature that forms the spokes, the rim, and the hub of the steering wheel. The armature is usually fabricated as a single piece or formed from separate parts that are welded or joined together with fasteners. The armature is encapsulated by an appropriate covering material such as wood, elastomeric materials, for example, polyurethane materials, or a combination of materials.

Disadvantages of known metal armatures are their relatively heavy weight and their high mass moment inertia. Further, the use of polyurethane materials can create work place environmental issues as well as worker safety issues. Also, because of the need to increase fuel economy of automobiles, weight reduction is an important aspect of automotive design. And as such the relatively heavy weight of known metal armatures needs to be overcome.

BRIEF DESCRIPTION OF THE INVENTION

In one aspect, a composite steering wheel for an automotive vehicle having a steering column is provided. The composite steering wheel includes a rim, a center hub, and a plurality of spokes connecting the rim to the center hub. The rim, the center hub and the plurality of spokes are formed from a deformable thermoplastic material. The composite steering wheel also includes an attachment member embedded in the center hub. The attachment member is sized to couple to the steering column.

In another aspect, a method of forming a composite steering wheel for an automotive vehicle having a steering column is provided. The method includes providing an attachment member sized to couple to the steering column, positioning the attachment member in the mold, and introducing a deformable thermoplastic material into the mold to form a rim, to form a center hub with the attachment member embedded therein, and to form a plurality of spokes connecting the rim to the center hub.

DETAILED DESCRIPTION OF THE INVENTION

A composite steering wheel formed from a deformable thermoplastic material which in one embodiment is over-molded around a metal or plastic rim element is described below in detail. In another embodiment the composite steering wheel does not include a rim element. The composite steering wheel includes vibration dampers located in the spokes of the steering wheel. Metal or plastic inserts in the rim and center hub permit the steering wheel to withstand occupant impact loads and to permanently deform to absorb energy and prevent "rebound" of the steering wheel back to the occupant during an impact event.

Figure 1:
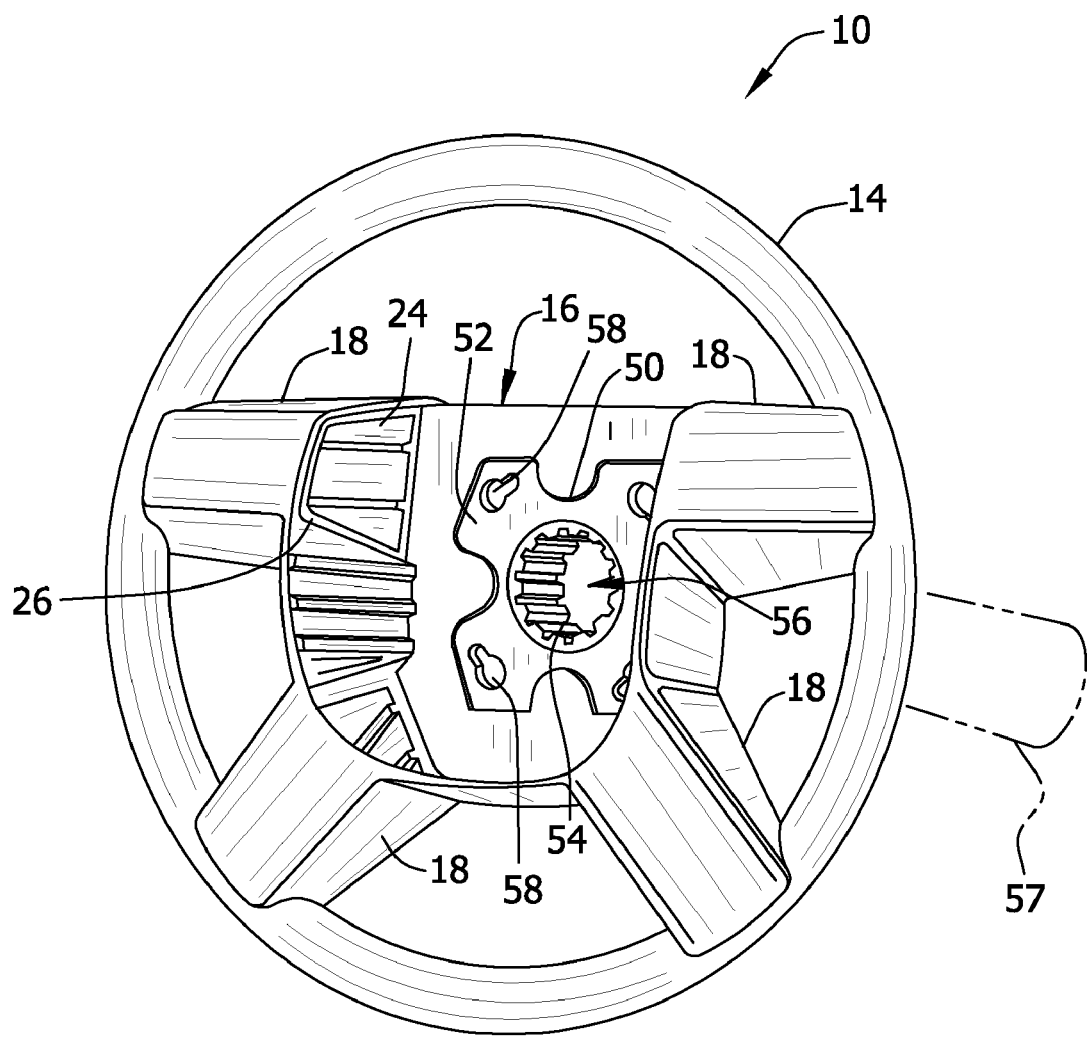
FIG. 1 is a perspective schematic illustration of a composite steering wheel in accordance with an embodiment of the present invention.
Figure 2:
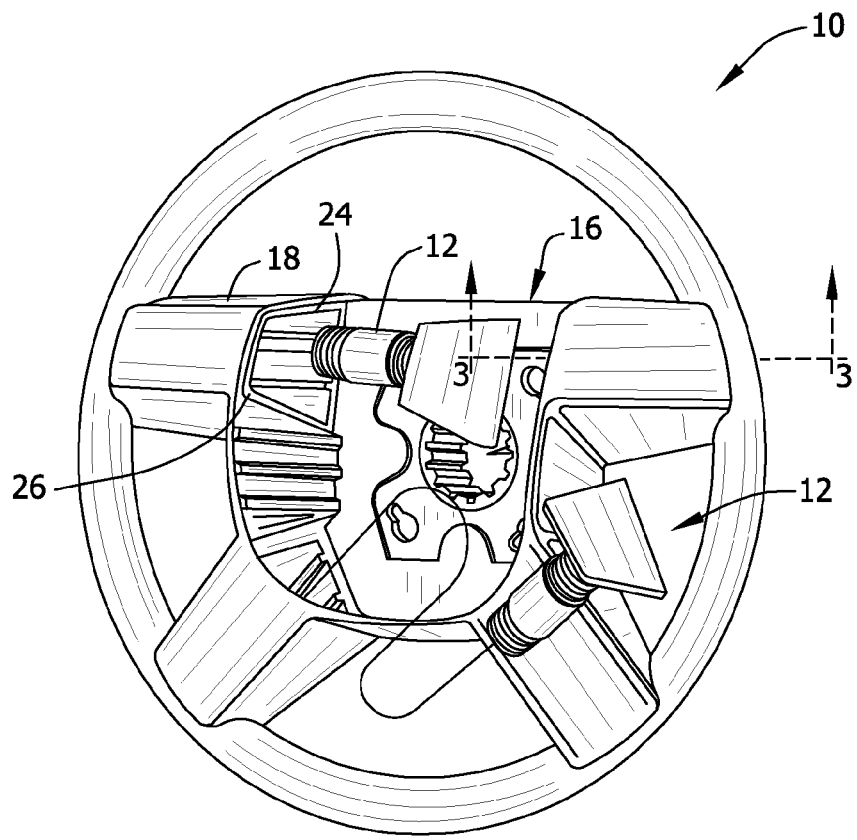
FIG. 2 is a perspective exploded schematic illustration of the composite steering wheel shown in FIG. 1 including vibration dampers.
Figure 3:
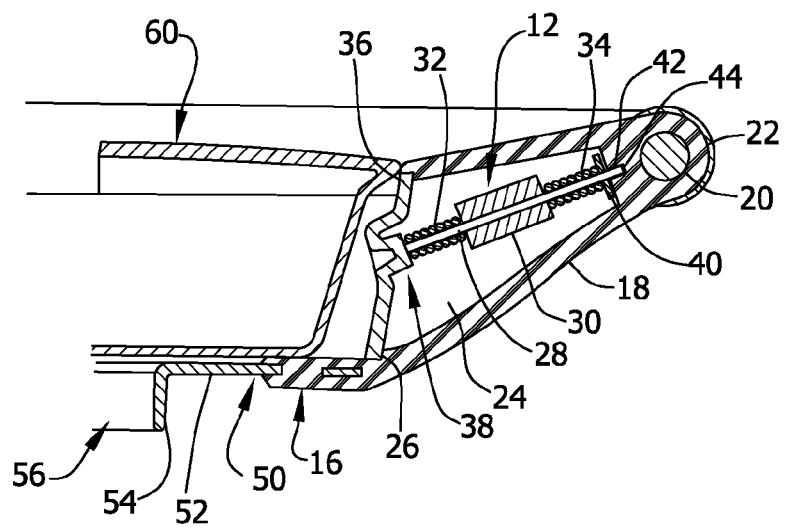
FIG. 3 is a sectional schematic illustration, along line 3-3 shown in FIG. 2, of a portion of the composite steering wheel shown in FIG. 2.

Referring to the drawings, FIG. 1 is a perspective schematic illustration of an exemplary embodiment of a composite steering wheel 10. FIG. 2 is a perspective schematic illustration of composite steering wheel 10 including vibration dampers 12, and FIG. 3 is a sectional schematic illustration of a portion of composite steering wheel 10. Referring to FIGS. 1-3, composite steering wheel 10 includes a rim 14, a center hub 16, and a plurality of spokes 18 (4 shown) connecting rim 14 to center hub 16. Rim 14 is formed from a metal or plastic rim element 20 over-molded with a deformable thermoplastic material 22. In the exemplary embodiment, rim element 20 is a metal or plastic rod that has a circular cross section. In another embodiment, rim element 20 is a hollow tubular element. Also, in alternate embodiments, rim element 20 has a rectangular or a polygonal cross sectional shape. Any suitable metal can be used to form rim element 20, including, but not limited to, steel, aluminum, and magnesium. Also, any suitable plastic material can be used to form rim element 20, for example, silicone modified polycarbonates, nylon, polyesters, polyphenylene oxide, polypropylene, and polyurethane. Particularly, rim element 20 can be solid or hollow polymeric material. A hollow core can be achieved by water assist, gas assist, rotational molding, or other methodologies employed to achieve hollow sections in polymeric materials. Also, the material can be foamed to introduce minute gas pockets dispersed throughout the core of the material of rim element 20. The foaming can be accomplished by various methods, including but not limited to, exothermic blowing agents, introduction of liquid nitrogen or nitrogen gas during the melt phase of processing, or other such methods. In an alternate embodiment, rim 14 is formed from thermoplastic 22 without the presence of rim element 20.

Spokes 18 and center hub 16 are formed from thermoplastic material 22, and are molded as one piece along with rim 14. Particularly, metal rim element 20 is positioned in a mold and thermoplastic material 22 is introduced into the mold so that thermoplastic material 22 forms spokes 18, center hub 16 and over-molds metal rim element 20 to form rim 14 with metal rim element 20 embedded in thermoplastic material 22. Any suitable molding technique can be used, for example injection molding. A suitable thermoplastic material 22 is deformable and absorbs energy during an impact event. Specifically, a suitable thermoplastic material has the properties of elastic deformation at low loads and plastic deformation at high loads. Low loads being characterized as those encountered during normal operation of a steering wheel, and high loads being characterized as severe abuse or impact events as defined under Federal Motor Vehicle Safety Standard 203. Further, thermoplastic material 22 has a 20 percent stress to failure rating as measured by tensile testing in accordance with ASTM D-638. Examples of suitable thermoplastic materials 22 include, but are not limited to, silicone modified polycarbonate, nylon, polyesters, polyphenylene oxide, polypropylene, mixtures thereof, and foamed materials thereof. In the exemplary embodiment, silicone modified polycarbonate, commercially available from the General Electric Company under the trademark Lexan® EXL, is used.

Each spoke 18 includes a hollow cavity 24 extending from center hub 16 to rim 14. Cavity 24 includes an access opening 26 adjacent center hub 16. Cavity 24 is sized to receive vibration damper 12 which includes a center rod 28, a weight (mass) 30 slidably coupled to center rod 28, a first spring 32 and a second spring 34. First and second springs 32 and 34 are positioned on opposite sides of weight 30. Vibration damper 12 also includes a first end cap 36 attached to first end 38 of center rod 28 that is sized to close opening 26 in cavity 24. A second end cap 40 is attached to second end 42 of center rod 28 and anchors second spring 34 to prevent second spring from moving past second end 42 of center rod 28. Second end 42 of center rod 28 is positioned in a bore 44 in the inner wall defining cavity 28 adjacent rim 14.

A flat or formed metal plate 50 is molded into center hub 18. Metal plate 50 includes a flat portion 52 and a center attachment portion 54 extending from flat portion 52 and through center hub 18. Attachment portion 54 includes an attachment bore 56 extending therethrough that is sized and shaped to receive the steering column 57 of an automobile vehicle to attach composite steering wheel 10 to the steering column. Flat portion 52 also includes a plurality of airbag attachment openings 58 that are sized for attachment of an airbag unit 60 to center hub 18 between spokes 16. Metal plate 50 acts as a reaction plate for airbag unit 60 during deployment of the airbag in an impact event. In one embodiment, flat portion 52 and attachment portion 54 are formed as a single piece. In another embodiment, attachment portion 54 is a separate piece that is attached to fiat portion 52 by any suitable method, for example, by welding, spin welding, swaging, cold heading, and the like. In an alternate embodiment, composite steering wheel includes an attachment sleeve that does nor include a flat plate portion. The attachment sleeve is embedded in the thermoplastic material and sized and shaped to receive the steering column of an automotive vehicle. Metal plate 50 can be formed from any suitable metal, for example, steel, aluminum, and magnesium.

While the invention has been described in terms of various specific embodiments, those skilled in the art will recognize that the invention can be practiced with modification within the spirit and scope of the claims.

What is claimed is:

1. A composite steering wheel for an automotive vehicle, the automotive vehicle having a steering column, said composite steering wheel comprising:
   a rim;
   a center hub;
   a plurality of spokes connecting said rim to said center hub, each said spoke comprising a hollow chamber extending through said spoke from said hub at least partially to said rim, each said hollow chamber having an access opening adjacent said center hub;
   said rim, said center hub, and said plurality of spokes formed from a deformable thermoplastic material;
   an attachment member embedded in said center hub, said attachment member sized to couple to the steering column; and
   a vibration damper assembly positioned in each said hollow chamber, said vibration damper assembly comprising an end cap, said end cap closing said access opening.

2. A composite steering wheel in accordance with claim 1 wherein said deformable thermoplastic material is a foamed thermoplastic material.

3. A composite steering wheel in accordance with claim 1 wherein said rim comprises a rim element, said deformable thermoplastic material overmolded around said rim element.

4. A composite steering wheel in accordance with claim 3 wherein said rim element comprises a metal material or a plastic material, said metal material selected from the group consisting of steel, aluminum, and magnesium, said plastic material selected from the group consisting of silicone modified polycarbonates, nylon, polyesters, polyphenylene oxide, polypropylene, and polyurethane.

5. A composite steering wheel in accordance with claim 3 wherein said rim element is solid or tubular and comprises a circular, rectangular, or polygonal cross sectional shape.

6. A composite steering wheel in accordance with claim 1 wherein said deformable thermoplastic material selected from the group consisting of silicone modified polycarbonates, nylon, polyesters, polyphenylene oxide, polypropylene, and foamed thermoplastic materials thereof.

7. A composite steering wheel in accordance with claim 1 wherein said deformable thermoplastic material further comprises a plurality of reinforcing fibers.

8. A composite steering wheel in accordance with claim 1 wherein said thermoplastic material has a 20 percent stress to failure rating as measured by ASTM D638.

9. A composite steering wheel in accordance with claim 1 wherein said vibration damper assembly comprises:
   a center rod;
   a weight slidably coupled to said center rod;
   a first spring positioned over said rod between said weight and a first end of said rod;
   a second spring positioned over said rod between said weight and a second end of said rod;
   a first end cap coupled to said first end of said rod, said first end cap sized to close said access opening; and
   a second end cap coupled to said second end of said rod.

10. A composite steering wheel in accordance with claim 1 wherein said attachment member comprises:
    a plate portion;
    an attachment portion extending from one side of said plate portion; and
    an attachment opening extending through said attachment portion, said attachment opening sized to receive the steering column.

* * * * *

UNITED STATES PATENT AND TRADEMARK OFFICE
CERTIFICATE OF CORRECTION

PATENT NO. : 7,597,028 B2 Page 1 of 1
APPLICATION NO. : 11/213544
DATED : October 6, 2009
INVENTOR(S) : Steven Stoll It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 597 days.

Signed and Sealed this

Twenty-eighth Day of September, 2010

David J. Kappos
*Director of the United States Patent and Trademark Office*